United States Patent [19]
Hellberg

[11] Patent Number: 6,061,705
[45] Date of Patent: May 9, 2000

[54] POWER AND AREA EFFICIENT FAST FOURIER TRANSFORM PROCESSOR

[75] Inventor: Richard Hellberg, Huddinge, Sweden

[73] Assignee: Telefonaktiebolaget LM Ericsson, Stockholm, Sweden

[21] Appl. No.: 09/010,130

[22] Filed: Jan. 21, 1998

[51] Int. Cl.$^7$ .................................................... G06F 15/00
[52] U.S. Cl. .......................... 708/408; 708/404; 708/409
[58] Field of Search ..................................... 708/403–409

[56] References Cited

U.S. PATENT DOCUMENTS

| | | |
|---|---|---|
| 4,689,762 | 8/1987 | Thibodeau, Jr. . |
| 4,821,224 | 4/1989 | Liu et al. . |
| 4,868,776 | 9/1989 | Gray et al. . |
| 5,034,910 | 7/1991 | Whelchel et al. . |
| 5,042,000 | 8/1991 | Baldwin . |
| 5,093,801 | 3/1992 | White et al. . |
| 5,095,456 | 3/1992 | Wong et al. . |
| 5,293,330 | 3/1994 | Sayegh . |
| 5,313,413 | 5/1994 | Bhatia et al. . |
| 5,473,556 | 12/1995 | Aguilar et al. ........................... 708/404 |
| 5,694,347 | 12/1997 | Ireland .................................... 708/404 |

FOREIGN PATENT DOCUMENTS

| | | |
|---|---|---|
| 92/18940 | 10/1992 | WIPO . |
| 97/19412 | 5/1997 | WIPO . |

OTHER PUBLICATIONS

*Electronics & Communication Engineering Journal*, Aug. 1995, pp. 169–177, G.M. Blair, "A review of the discrete Fourier transform, Part 1: Manipulating the powers of two".

*IEEE Signal Processing*, Apr. 1994, vol. 11, No. 2, ISSN 1053–5888, pp. 24–35, Peter Kraniauskas, "A Plain Man's Guide to the FFT".

Shousheng He, "Concurrent VLSI Architectures for DFT Computing and Algorithms for Multi–output Logic Decomposition, Ph.D. Thesis, Lund University, 1995, Chapter 8: A Pipeline FFT Processor Based on the Radix–$2^2$ Algorithm".

Bernard, E. et al., "A Pipeline Architecture for Modified Higher Radix FFT," Digital Signal Processing 2, Estimation, VLSI, San Francisco, Mar. 23–26, 1992, vol. 5, No. Conf. 17, Mar. 23, 1992, pp. 617–620, XP000341496, Institute of Electrical and Electronics Engineers.

Widhe T., et al., "Design of efficient radix–8 butterfly PEs for VLSI," Proceedings of 1997 IEEE International Symposium on Circuits and Systems in the Information Age, ISCAS '97 (Cat. No. 97CH35987), Proceedings of 1997 IEEE International Symposium on Circuits and Systems, Circuits and Systems in TH, pp. 2084–2087, vol. 3, XP002074421, ISBN 0–7803–3583–X, 1997, New York, NY, USA, IEEE, Bernard, E. et al., "A Pipeline Architecture for Modified Higher Radix FFT," Digital Signal Processing 2, Estimation, VLSI, San Francisco, Mar. 23–26, 1992, vol. 5, No. Conf. 17, Mar. 23, 1992, pp. 617–620, XP000341496, Institute of Electrical and Electronics Engineers.

Swartzlander, Jr., E.E., et al., "A Radix–8 Wafer Scale FFT Processor," Journal of VLSI Signal Processing, vol. 4, No. 2/03, May 1, 1992, pp. 165–176, XP0002733177.

*Primary Examiner*—Tan V. Mai
*Attorney, Agent, or Firm*—Nixon & Vanderhye

[57] ABSTRACT

A fast Fourier transform (FFT) processor is constructed using discrete Fourier transform (DFT) butterfly modules having, in preferred example embodiments, sizes greater than 4. In a first example embodiment, the FFT processor employs size-8 butterflies. In a second example embodiment, the FFT processor employs size-16 butterflies. In addition, low power, fixed coefficient multipliers are employed to perform nontrivial twiddle factor multiplications in each butterfly module. The number of different, nontrivial twiddle factor multipliers is reduced by separating trivial and nontrivial twiddle factors and by taking advantage of twiddle factor symmetries in the complex plane and/or twiddle factor decomposition. In accordance with these and other factors, the present invention permits construction of an FFT processor with minimal power and IC chip surface area consumption.

45 Claims, 10 Drawing Sheets

POWER AND AREA EFFICIENT FAST FOURIER TRANSFORM PROCESSOR

FIELD OF THE INVENTION

The present invention relates to a fast Fourier transform (FFT) processor, and in particular, to an FFT pipeline processor architecture that optimally minimizes power consumption and integrated circuit area requirements.

BACKGROUND AND SUMMARY OF THE INVENTION

Fourier transformation is a well-known technique for analyzing time varying signals. In simple terms, the Fourier transformation converts a signal from a time varying format to a frequency varying format. The inverse Fourier transform performs the opposite conversion. When a signal is expressed in discrete form by a series of successive signal samples taken at regular time periods, the corresponding Fourier transformation is referred to as discrete Fourier transform (DFT).

At a relatively high level, the DFT is a simple algorithm. It consists of stepping through digitized data points of an input function, multiplying each data point by sine and cosine functions, and summing the resulting products, one for the sine component and another for the cosine component in corresponding accumulators. When every data point has been processed in this manner, the sine and cosine accumulators are divided by the number of data points processed. The resulting quantities are the average values for the sine and cosine components of the frequency currently being investigated. This process is repeated for all integer multiple frequencies up to the frequency equal to twice the Nyquist frequency.

In more formal terms, the DFT and inverse DFT are defined as follows:

$$F(f) = \sum_{T=0}^{N-1} f(T) W_N^{fT} \quad (1)$$

$$f(T) = 1/N \sum_{f=0}^{N-1} F(f) W_N^{-fT} \quad (2)$$

where

F(f)=frequency components or transform f(T)=time base data points or inverse transform N=number of data points T=discrete times f=discrete frequencies $W_N = e^{-j2\pi/N} = \cos(2\pi/N) - j \sin(2\pi/N) =$ "twiddle factor"

Thus, the twiddle factor is a complex number, and in the general case, both the frequency domain and the time domain functions may be complex numbers. Multiplication of two complex quantities yields the following terms:

$$(A+jB)(C+jD) = AC+jAD+jBC-BD = (AC-BD)+j(AD+BC) \quad (3)$$

The term (A+jB) may be viewed, for example, as the time domain function, and the term (C+jD) may be viewed as $W_N$, i.e., $W_N = \cos(2\pi/N) + j \sin(2\pi/N)$.

The practical problem with the DFT is that it takes so long to compute. In fact, executing a DFT requires performing on the order of $N^2$ complex operations for N data points. A complex operation includes evaluating sine and cosine functions, multiplying by the data point, and adding those products. This problem is particularly troublesome in applications where there may be tens of thousands of data points to transform in "real time." On the other hand, if the number of data points is reduced, the number of operations will be reduced as the square. Thus, splitting the data sequence into two equal parts and processing each part separately saves computing half the operations. This is the approach used to develop the fast Fourier transform (FFT). The input data array is divided into smaller and smaller arrays to reduce the amount of the computation and then the transform results are recombined using a characteristic crossover pattern called a "butterfly" which is really a small FFT. The size of the butterflies in an FFT is called the FFT's "radix" (R). Thus, if a large DFT is replaced by multiple small DFTs, e.g., butterflies with a size of 2 or 4, the number of complex operations is substantially reduced. Even if the number of operations decreases as the DFT's size is reduced, that DFT size reduction "costs" on the order of N operations—thus, the familiar NlogN computation complexity for the FFT.

Figure 1A:
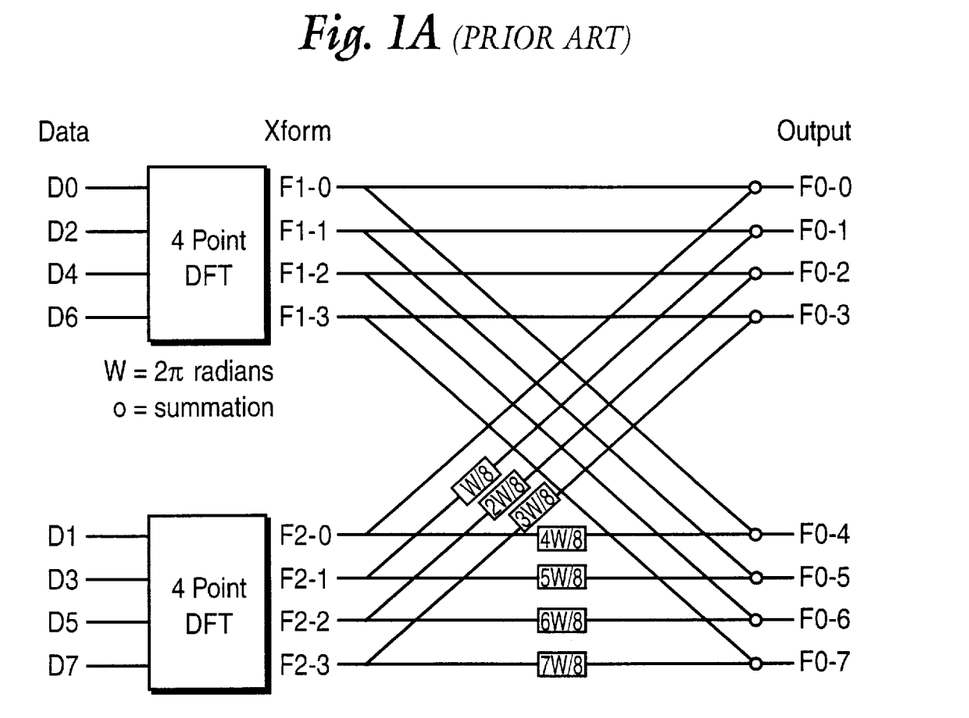
FIG. 1A is a fast Fourier transform (FFT) butterfly flow diagram where two 4-point DFTs are employed to perform an eight-point DFT operation.

FIG. 1A illustrates an example FFT butterfly signal flow diagram for an N=8 data point array D0–D7. The even components of the array are input to a first 4-point DFT (half the size of an 8-point DFT), and odd data points D1, D2, D5, and D7 are input to a second 4-point DFT. The outputs of the two four-point arrays are combined to generate the eight-point sequence corresponding to an eight-point DFT by repeating each set of four frequency components a second time and then summing the even and odd sets together. However, before the summation, the odd DFT frequency components must be phase shifted because the odd terms in the time domain were shifted by one data point. The phase shift is indicated by the various blocks and ranges from zero to $2\pi$ radians in increments of $\pi/4$ radians.

Figure 1B:
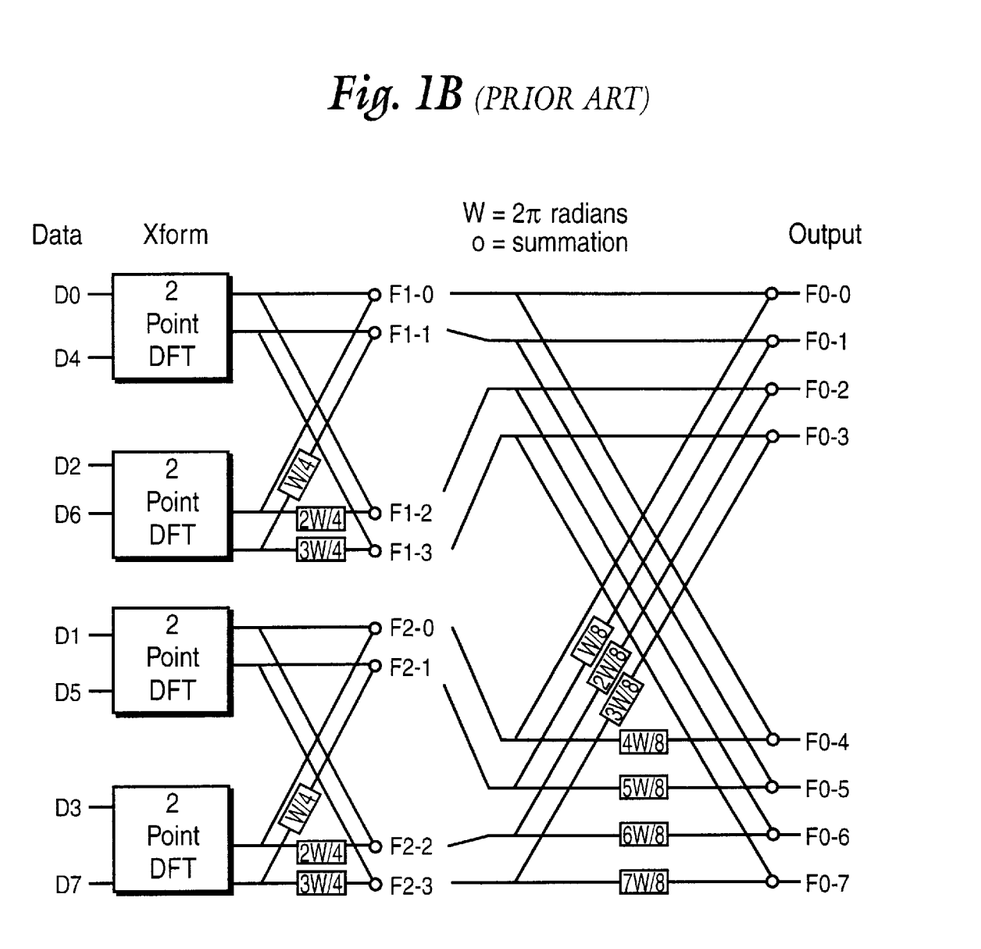
FIG. 1B is a double butterfly FFT flow diagram for implementing an 8-point DFT.

This divide-and-conquer approach can be extended as shown in FIG. 1B where each of the four-point DFTs is split into two, 2-point DFTs. Of course, then the four 2-point DFTs must be combined into two 4-point DFTs which are combined as described above into a single 8-point DFT. The total processing time is again reduced almost by half.

Accordingly, the 8-point FFT input data is divided into subsets of only two or four data points upon which two or four point discrete Fourier transforms are performed. The transform outputs are multiplied by appropriate "twiddle factors," and then subjected to further two or four point Fourier transformation.

FFT computations of high speed digital signals in real-time are important for many signal processing systems and applications. Asymmetrical digital subscriber line (ADSL), digital audio broadcasting (DAB), digital video broadcasting (DVB), multi-carrier modulation (MCM) schemes, of which orthogonal frequency division multiplexing (OFDM) is one, sonar, radar, block-based filtering and fast convolution, decimated filter banks, equalizers for magnetic storage, echo cancellers, and multi-path equalization are examples of high speed FFT applications. FFT processors also find application for example in digital mobile cellular radio systems where both power consumption and IC chip size should be minimized. The more power consumed, the more heat produced. There is an upper limit for chip size, and there is also an upper limit for how much power that can be used in a specific IC encapsulation. Reduced power consumption makes it possible to use cheaper IC encapsulation of the chip. These are among the most important factors to consider in building a one chip processing device such as an FFT processor.

While processing speed is of course important, e.g., for real time applications, power consumption also increases with the number of multiplications, additions, and register operations performed. IC chip area increases with the number of hardware components like multipliers, adders, and registers that are used. The goal of the present invention is to minimize the number of components and the amount of operations performed to minimize IC chip area and power consumption.

There have been many different approaches to increase speed and/or minimize power consumption and IC chip area requirements. One of the most successful approaches is to pipeline the process. A pipelined processor divides the computing load into successive stages allowing parallel processing. In essence, pipeline operation enables a partial result, obtained from a preceding stage of the processor, to be immediately used in a following stage without delay. A real-time, pipelined processor's processing speed must match the input data rate, i.e., the data acquisition speed for continuous operation. This means that an FFT pipelined processor must compute an N length DFT in N clock cycles since the data acquisition speed is one sample per cycle.

One proposed pipelined FFT architecture for very large scale integration (VLSI) is disclosed in WO 97/19412 published May 29, 1997 in the name of Shousheng He. The proposed pipelined FFT architecture is a single-path, delay-feedback (SDF), radix-2 FFT where twiddle factors are decomposed to form a radix-4 structure. A radix-$2^2$ has the same multiplicative complexity as a radix-4 algorithm, but retains a radix-2 butterfly structure.

Figure 2A:
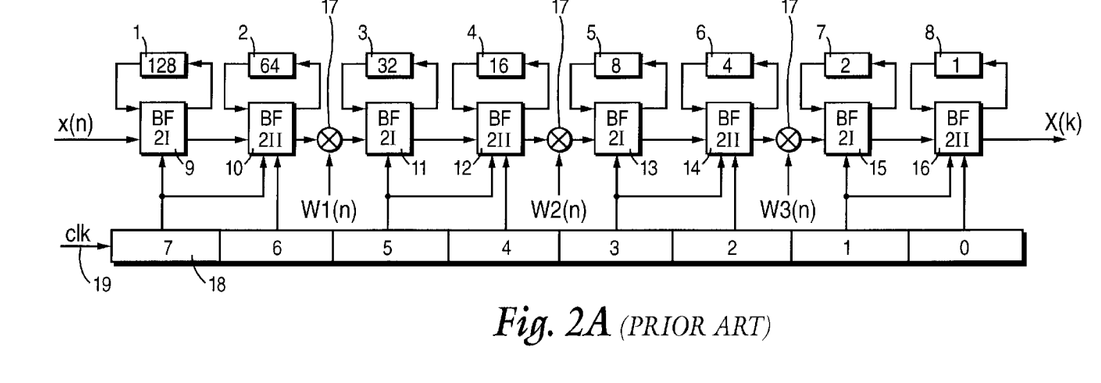
FIG. 2A is a radix-$2^2$ single delay feedback (SDF) pipeline FFT processor architecture for N=256.
Figure 2B:
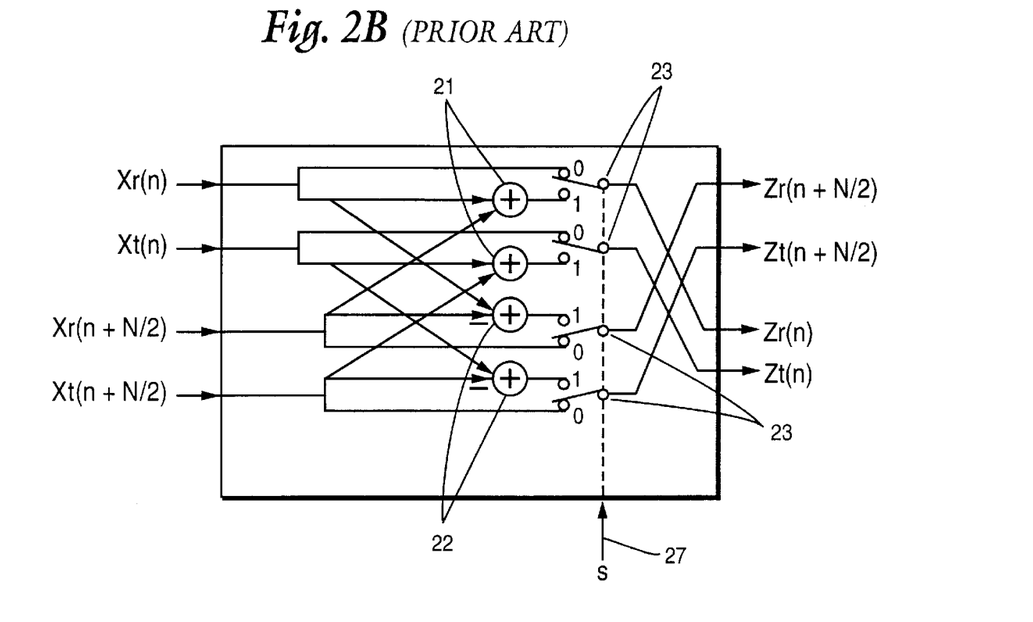
FIG. 2B is a diagram of a first two-point butterfly structure used in the radix-$2^2$ SDF pipeline FFT processor shown in FIG. 2A.
Figure 2C:
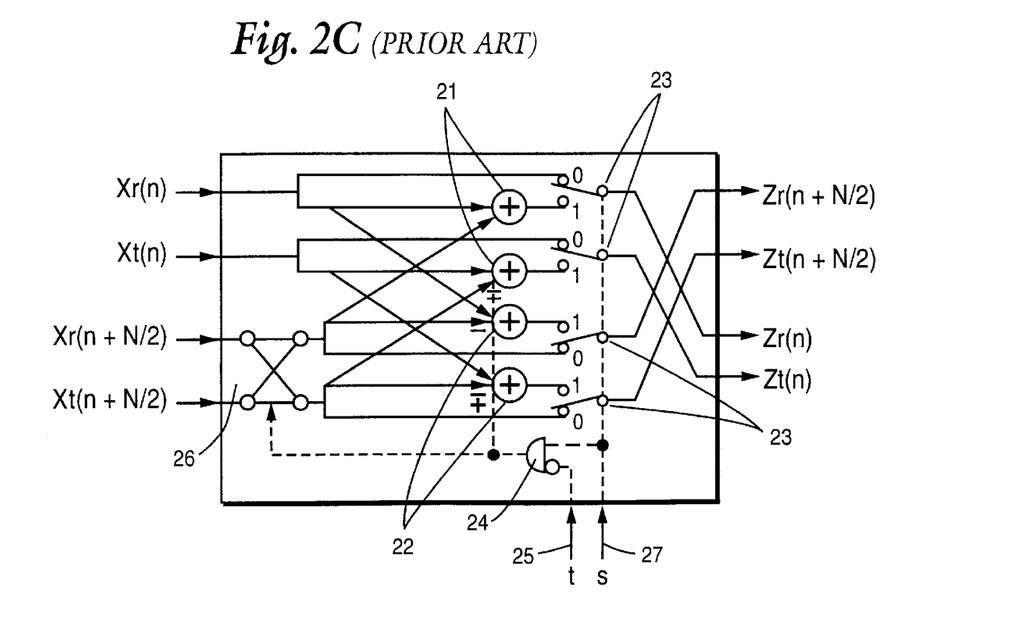
FIG. 2C is a diagram of a second butterfly structure used in the radix-$2^2$ SDF pipeline FFT processor shown in FIG. 2A.

The mathematical details of how He decomposes the total multipliers into trivial and non-trivial multipliers are described in WO 97/19412. Architecturally, a real-time, pipeline FFT processor like He's is shown in FIG. 2A for 256 data points, i.e., N=256. More specifically, the input data sequence is passed to the first pair of a pair butterfly units 9 and 10. A 128-word feedback register 1 links the output of butterfly 9 to its input. The second butterfly unit 10 has a sixty four word feedback register 2. Multiplier 17 links the first stage of the processor, comprising butterfly units 9 and 10, to the second stage of the processor comprising butterfly units 11 and 12, and multiplies the data stream by a twiddle factor W1(n). The structure of butterfly units 9, 11, 13, and 15, differs from butterfly units 10, 12, 14, and 16 as illustrated in FIGS. 2B and 2C, respectively. Butterfly units 11 and 12 are provided with feedback registers 3 and 4 having a thirty two word and a sixteen word capacity, respectively. A multiplier 17, located between the second and third stage of the processor, multiplies the data stream by a twiddle factor W2(n). The third stage of the processor comprises butterflies 13 and 14, eight word feedback register 5, and four word feedback register 6. A multiplier 17, located between the third and fourth stages, of the processor multiplies the data stream by a twiddle factor W3(n). The fourth stage of the processor comprises butterfly units 15 and 16, with two word feedback register 7, and one word feedback register 8. The output sequence X(k) is derived from the output of the fourth stage of the processor. The binary counter 18, clocked by a clock signal 19, acts as a synchronization controller and address counter for the twiddle factors used between each stage of the processor. The type BF2I butterfly illustrated in FIG. 2B includes two adders 21, two subtractors 22, and four multiplexers 23. Operation of the multiplexers is controlled by control signal 27. The type BF2II butterfly, illustrated in FIG. 2C, is similar in construction to the type BF2I butterfly, but includes a 2×2 commutator 26 and a logic gate 24, i.e., an AND gate with one inverted input. Control signal 25 is applied to the inverted input of AND gate 24, and control signal 27, which is also applied to the multiplexers 23, is applied to the non-inverted input of AND gate 24. The output from AND gate 24 drives commutator 26.

The operation of the radix-$2^2$ single delay feedback FFT processor in FIG. 2A is as follows. On the first N/2 cycles, the 2-to-1 multiplexers 23 in the first butterfly module switch to position "0," and the butterfly is idle. The input data from the left is directed to the feedback shift registers until they are filled. On the next N/2 cycles, the multiplexers 23 turn to position "1," the butterfly unit computes a 2-point DFT with the incoming data and the data stored in the shift registers.

$$Z1(n)=x(n)+x(n+N/2) \quad (4)$$

$$0 \leq n < N/2 \, Z1(n+N/2)=x(n)-x(n+N/2) \quad (5)$$

The butterfly output Z1(n) is sent to apply the twiddle factor and Z1(n+N/2) is sent back to the shift registers to be "multiplexed" in next N/2 cycles when the first half of the next frame of the time sequence is loaded.

The operation of the second butterfly is similar to that of the first one, except the "distance" of the butterfly input sequence is just N/4, and the trivial twiddle factor multiplication is implemented by real-imaginary swapping by commutator 26 and controlled add/subtract operations. This requires a two bit control signal 25 and 27 from the synchronizing counter 18. The data then passes through a full complex multiplier 17, working at 75% utility, to produce the results of the first level of the radix 4 FFT word-by-word. Further processing repeats this pattern with the distance of the input data decreasing by half at each consecutive butterfly stage. After N-1 clock cycles, the complete DFT transform result X(k) is output in bit-reversed order. The next frame of the transform is then processed without pausing because of the pipelined processing at each stage of the processor.

The WO 97/19412 application to He contends that this radix-$2^2$ SDF FFT processor architecture is the most optimal for pipelined FFT computation. However, even greater reductions in FFT processor IC area and power consumption may be achieved using the present invention.

The computation of a large DFT using multiple, small DFTs (i.e., the FFT, divide-and-conquer principle) is a multi-stage process that may be implemented in an iterative or a pipelined architecture. Even though this divide-and-conquer strategy saves computations, there is an increased number of complex twiddle factor multiplications performed between the smaller stages. Two point or four point DFTs/butterflies are desirable from the standpoint that the twiddle factor multiplications performed in each butterfly are trivial because the multiplier coefficients are simply ±1 or j. In other words, complex number multiplication circuits are not needed for the individual transformations in the two or four point DFTs—only "trivial" multiplications. Trivial multiplications are performed without multipliers simply by passing the data through with no operation, or by changing a sign, or by switching real and imaginary components. In other words, nontrivial, computationally expensive multiplications are avoided. However, a substantial number of nontrivial, complex number multiplications are necessary for twiddle factor multiplications between 2-point and 4-point DFT butterfly stages in the FFT.

Conventional thinking holds that as the radix of the FFT (i.e. the size of the basic DFT computational unit) increases to 8, 16, and greater, (i.e., a division of the transform into 8, 16, or greater number of branches in the divide and conquer method), the computational "cost" in terms of nontrivial multiplications that must be performed in each high radix butterfly (the butterfly in a higher radix FFT) increases effectively canceling the gains obtained by the decreased number of twiddle factor multipliers between the butterflies. The inventor discovered that this is not necessarily true. Contrary to that conventional thinking, the present invention provides a very powerful and IC chip area efficient FFT processor using a relatively small number of low power, fixed coefficient multipliers in FFTs having radixes greater than 4. The use of only a relatively small number of fixed coefficient multipliers is achieved by taking advantage of certain twiddle factor relationships (explained in the detailed description below).

Thus, the present invention pertains to fast Fourier transform (FFT) processors of higher radixes while at the same time using only minimal integrated circuit chip area to efficiently perform fast Fourier transform operations with minimal power. Preferably, the present invention is employed in any FFT architecture having a radix greater than 4. The example embodiments use butterfly modules having sizes of 8 or 16 in the context of a real-time, pipeline FFT processor architecture. For a radix-8 implementation, the FFT processor is constructed using radix-$2^3$ butterfly processing modules. For a radix-16 implementation, the FFT processor is constructed using radix-$2^4$ butterfly processing modules.

In the radix-8 example embodiment implemented as a radix-$2^3$, each butterfly module is implemented using three, 2-point butterfly units coupled together in pipeline fashion. An input data sequence is applied to an input of one of the three butterfly units and processed through the three, pipelined butterfly units to generate a Fourier transformed data sequence. Each butterfly unit includes a single delay feedback register. Of the three nontrivial, twiddle factor multiplications (each of these three nontrivial, twiddle factor multiplications is performed multiples times in the butterfly) required for a radix-8 butterfly module, the present invention implements those three multiplications using only one fixed coefficient multiplier circuit. In the radix-16 example embodiment implemented as a radix-$2^4$, each butterfly module is implemented using four, 2-point butterfly units coupled together in pipeline fashion. Of the nine, nontrivial, twiddle factor multiplications (each of these nine, nontrivial, twiddle factor multiplications is performed multiple times in the butterfly) required for a radix-16 butterfly module, the present invention implements those nine multipliers using only two fixed coefficient multiplier circuits.

BRIEF DESCRIPTION OF THE DRAWINGS

These features and objects of the present invention (as well as others) will now be described in conjunction with the drawings in which.

DETAILED DESCRIPTION OF THE DRAWINGS

In the following description, for purposes of explanation and not limitation, specific details are set forth, such as particular embodiments, techniques, hardware circuits, devices, etc. in order to provide a thorough understanding of the present invention. For example, preferred example embodiments of the invention are for a radix-$2^3$ and a radix-$2^4$ pipelined, FFT processor. However, these embodiments and architectures are only examples, and it will be apparent to one skilled in the art that the present invention may be practiced in other embodiments that depart from these specific details. In other instances, detailed descriptions of well-known DFT/FFT methods, devices, and techniques are omitted so as not to obscure the description of the present invention with unnecessary detail.

As described above, conventional thinking with respect to DFT/FFT calculations is that little can be gained by using radix-8 or -16 FFT processors since the number of calculations does not decrease significantly. Some experts in the FFT field further contend that a split-radix FFT is the most efficient because it uses the lowest known number of nontrivial operations for computing a DFT of length $2^n$. Contrary to that conventional thinking and those contentions, the inventor discovered that significant gains may be made in reducing power consumption and integrated circuit (IC) chip surface area using higher radix FFT processors, in particular, radix-8 and radix-16, using fixed coefficient multipliers and exploiting certain advantageous relationships between the twiddle factors to reduce the actual number of fixed coefficient multipliers to implement the necessary twiddle factor multiplications. Indeed, while simple extrapolation to higher radixes does not necessarily lead to greater efficiencies in terms of IC chip area or power requirements, the present invention exploits twiddle factor symmetry in the complex plane, decomposition of twiddle factors, and fixed coefficient multipliers to achieve significantly greater efficiencies in both IC chip area and power consumption.

An Example Radix-8 FFT Processor

Figure 3:
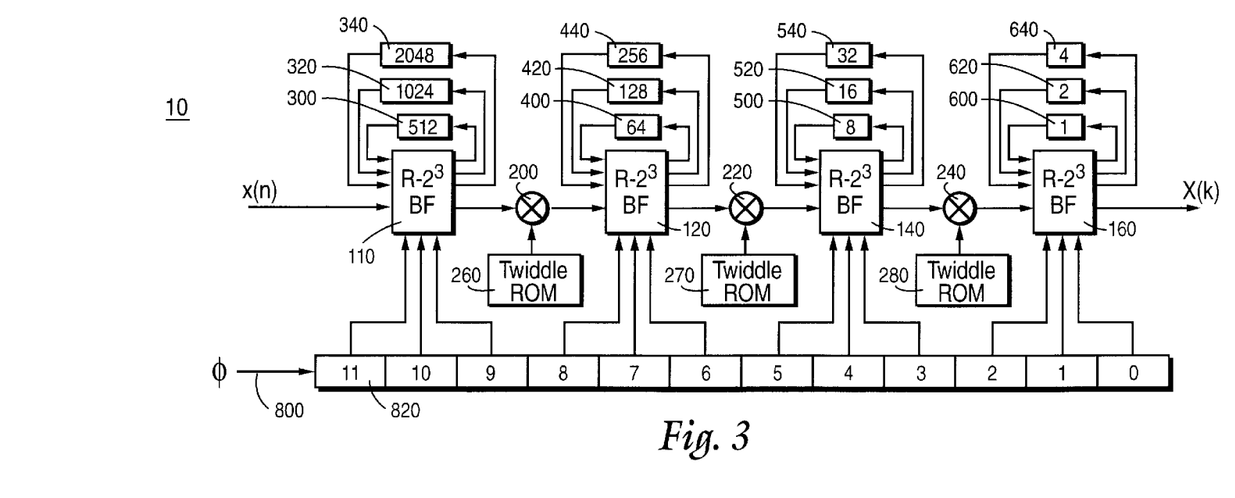
FIG. 3 is a diagram of a radix-$2^3$ single path delay feedback real time pipeline processor in accordance with one example embodiment of the present invention.

A first example embodiment of the present invention for a radix-8 FFT processor is preferably implemented using a radix-$2^3$ single path delay feedback (SDF) pipelined FFT processor architecture, such as the example shown in FIG. 3, for an N=4,096 data point array. Each of the four, 8-point butterflies in FIG. 3 is constructed using three, pipelined, 2-point butterflies. An input data sequence x(n) is input to a first radix- $2^3$ butterfly module 110. The output from each radix-$2^3$ (8) BF module is the 8-point FFT of the input to the module, where the frequency components 0–7 are output in bit-reversed order 0, 4, 2, 6, 1, 5, 3, 7. That output is coupled to multiplier 200 for multiplication with a first twiddle factor multiplier $W_{4096}^{n*k}$, where n goes from 0 to 7 in the bit-reversed order (see above) for each value of n, k that goes from 0 to (4096/8−1)=511. Accordingly, 4096 twiddle factor values, of which about ⅛ (512) are trivial, are stored in the twiddle ROM 260.

The twiddled products are applied to a second radix-$2^3$ butterfly module 120, and the output sequence is multiplied in multiplier 220 with a second twiddle factor multiplier $W_{512}^{n*k}$, where n goes from 0 to 7 in the bit-reversed order for each value of n, k that goes from 0 to (4096/$8^2$−1)=63. Those 4096 twiddle factor values, of which about ⅛ are trivial, are stored in the twiddle ROM 270.

The twiddled products are processed in a third radix-$2^3$ butterfly module 140. The output is multiplied in multiplier 240 by a third twiddle factor multiplier $W_{64}^{n*k}$ where n goes from 0 to 7 in the bit-reversed order (which repeats 64 times) for each value of n, k that goes from 0 to (4096/$8^3$−1)=7, the values of which are stored in the twiddle ROM 280. The twiddled products are processed in a final radix-$2^3$ butterfly module 160 to produce the Fourier transformed output sequence X(k).

Each of the butterfly modules 110, 120, 140, and 160 includes three feedback paths. In particular, butterfly module 110 includes a first feedback path having a 2,048-word feedback register, a second feedback path having a 1,024-word feedback register, and a third feedback path having a 512-word feedback register 300. The butterfly module 120 includes a first feedback path including a 256-word register 440, a second feedback path including a 128-word feedback register 420, and a third feedback path including a 64-word register 400. The third butterfly module 140 includes a first feedback path including a 32-word register 540, a second feedback path including a 16-word register 520, and a third feedback path including an 8-word register 500. The butterfly module 160 includes a first feedback path including a 4-word feedback register 640, a second feedback path including a 2-word feedback register 620, and third feedback path including a 1-word feedback register 600. A binary counter 820 is clocked by a clock signal 800. The binary counter acts as a synchronization controller and address counter for the total factors used between various stages of the FFT processor. The various feedback registers provide X samples of delay so that the data can be processed at different times.

Each one of the butterfly modules 110, 120, 140, and 160 includes three pipelined, 2-point butterfly units (BF2). Each butterfly module implements a radix-8, (i.e., eight-point), FFT algorithm but the radix-8 butterfly is "decomposed" into three, cascaded, radix-2 butterfly units. Butterfly module 160, for example, includes a first butterfly unit 160a coupled to a second butterfly unit 160b, which in turn, is coupled to a third butterfly unit 160c. The internal structure of each butterfly unit 160a–160c may be similar to that shown in FIG. 2A. Another butterfly unit implementation may employ the structure shown in FIG. 2B to perform the multiplications of j and −1 with a real/imaginary shift and an add/subtract shift. However, the trivial multiplications may be implemented using other methods.

Each butterfly unit is clocked by the synchronization controller and address counter using timing pulses 2, 1, and 0, respectively. Each butterfly unit includes a single path feedback delay loop and register. Butterfly unit 160a includes a four word feedback register 64. Butterfly unit 160b includes a 2-word feedback register 620, and butterfly unit 160c includes a 1-word feedback register 600.

Figure 4:
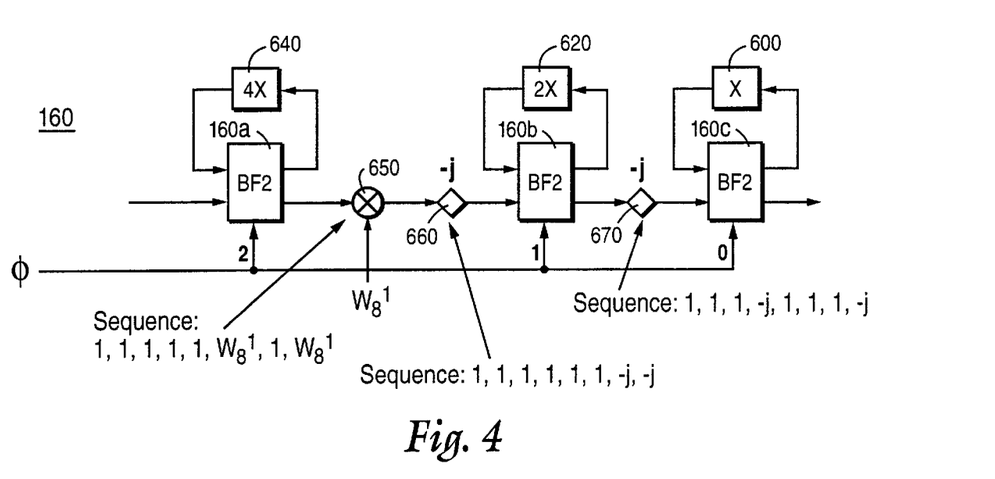
FIG. 4 is a diagram showing a radix-$2^3$ butterfly used in implementing the radix-$2^3$ FFT employed shown in FIG. 3.

FIG. 4 may be generalized for any radix-$2^3$ butterfly unit using feedback registers of size 4X, 2X, and X, where X=1, 8, 64, 512, etc. The sequences or coefficients are the values that the data will be multiplied by when passing through the multiplier as shown in FIG. 4. The sequences are processed X times before changing to the next value. The value of X depends on where in the pipeline chain the radix-8 butterfly is placed. For the rightmost module 160, X=1; for the leftmost module 110, X=512; for the module 140, X=8; and for the module 120, X=64.

Recalling the butterfly structure shown in FIG. 1A, many of the butterfly unit outputs are simply multiplied by trivial multipliers which include +1, −1, +j, −j. However, these trivial multiplications are implemented (without multipliers) using no operation, sign changes, or real/imaginary component "swapping." The nontrivial, twiddle factor multiplications, (such as the W1(n), W2(n), W3(n) as shown in FIG. 2A), are performed by dynamic multipliers, (such as the dynamic multipliers 17 in FIG. 2A), between the butterfly modules.

Thus, conventional FFT processors employ dynamic multipliers to perform twiddle factor multiplications. A dynamic multiplier is "dynamic" in the sense that if the dynamic multiplier performs a multiplication between an input data word "A" and a coefficient word "B," the digit values of word "B" can change to virtually any value. Although flexible in terms of multiplying the output sequence by different twiddle factor coefficient values, dynamic multipliers consume considerable amounts of power even though they can be implemented using relatively small amounts of IC surface area. In a fixed coefficient multiplier, the digit values of word "B" are constant.

In practice, multiplications of binary numbers are implemented by shifting various versions of the two binary data words to be multiplied and then adding the shifted versions together. Because one of the data words is known for a fixed coefficient multiplier, the multiplier does not have to perform any other multiplication. As a result, a fixed coefficient multiplier includes only about half of the hardware used in a dynamic multiplier. Further, the known data word may be recoded into a very efficient format so that fixed coefficient power consumption is considerably reduced as compared to a dynamic multiplier. The disadvantage of fixed coefficient multipliers is that a separate multiplier is required for each different coefficient. Consequently, IC chip surface area is consumed as the number of different fixed coefficient multipliers increases.

As the size of the butterfly module increases to 8 and 16, the number of twiddle factor multipliers between the butterfly modules decreases. However, the percentage of the data passing through the multiplier that must be multiplied by a twiddle factor increases. Also, the number of twiddle factor multiplications performed in each butterfly module increases. For a radix-4 FFT, 75% of the data points passing between each four point butterfly module must be multiplied by twiddle factors. That percentage increases to 87.5% for radix-8 FFTs and to 93.75% for radix-16 FFTs.

The net effect of the decreased number of twiddle factor multiplications performed by the dynamic multipliers between the butterfly modules and the increases in the number of twiddle factor multiplications within each butterfly module for increased radix FFTs is a relatively small decrease in the total number of multiplications performed. The number of different twiddle factor values that are used in the butterfly modules of higher radix FFTs can be reduced by using methods according to the invention. Given the smaller number of different value, nontrivial, twiddle factor multiplications to be performed in each butterfly module, the present invention implements them using fixed coefficient multipliers which consume much less power than dynamic multipliers. As the number of different value, nontrivial, twiddle factor multiplications to be performed in each butterfly module otherwise would increase, fixed coefficient multipliers in that case become less attractive in terms of the increased IC chip area consumed.

The present invention reduces the number of different value, nontrivial, twiddle factor multiplications to be performed in each butterfly module by (1) taking advantage of symmetries of the twiddle factors in the complex plane, and alternatively or in addition, (2) by decomposing the twiddle factors. Both techniques are discussed in conjunction with the twiddle factor vector diagram shown in FIG. 5.

Figure 5:
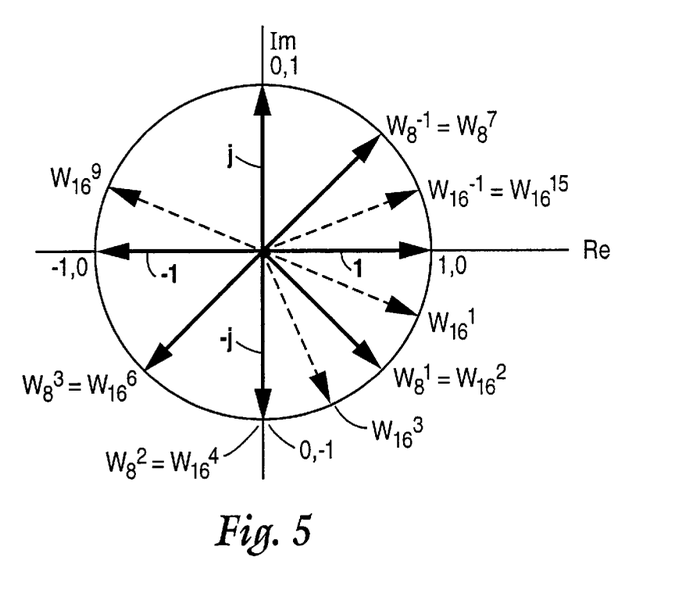
FIG. 5 is a vector diagram showing the twiddle factors for a radix-8 and radix-16 DFT butterfly modules in the complex plane.

Twiddle factors can be viewed in the complex plane as vectors having a magnitude of "1" and a particular phase angle. Accordingly, multiplying a vector by a twiddle factor is equivalent to rotating that vector by a phase angle of $$\frac{2\pi n}{N}$$

radians. Observe in FIG. 5 that for a radix-8 butterfly module the twiddle factor $W_8^0$ corresponds to the trivial, real value of "1". The twiddle factor $W_8^2$ corresponds to the trivial, imaginary value of "-j". The twiddle factor $W_8^1$ corresponds to a nontrivial complex value of $$\frac{1}{\sqrt{2}}(1-j).$$

The twiddle factor $W_8^3$ corresponds to a nontrivial complex value of $$\frac{1}{\sqrt{2}}(-1-j).$$

Notice the symmetry between $W_8^1$ and $W_8^3$. The only difference is that the signs of their real components are different. Using that symmetrical relationship, the same multiplier circuit, e.g., a $W_8^1$ may be used to perform the nontrivial, complex twiddle factor multiplications for both $W_8^1$ and $W_8^3$ with only a sign change being required for one of the factors.

Alternatively, the twiddle factor $W_8^3$ may be decomposed as follows: $W_8^3 = W_8^1 \cdot W_8^2$. Again, the twiddle factor $W_8^3$ may be implemented using the same $W_8^1$, multiplier circuit followed by a trivial multiplication, i.e., $W_8^2 = -j$, implemented using sign changes and real and imaginary component swapping. By either taking advantage of the twiddle factor symmetry or by decomposing nontrivial twiddle factors into common factors, the number of unique, fixed coefficient multiplier circuits is reduced thereby further minimizing the amount of IC chip area required for the higher radix FFT processor.

Thus, the present invention in the first example embodiment employs a radix-8 butterfly module that uses fixed coefficient multipliers to perform the nontrivial twiddle factors within each radix-8 butterfly module. Moreover, using twiddle factor symmetry or decomposition, the nontrivial twiddle factor multiplications are performed using minimal fixed coefficient multiplier hardware. As explained above, each radix-8 butterfly requires twiddle factor multiplications with twiddle factors $W_8^1$, $W_8^2$, and $W_8^3$. The twiddle factor $W_8^2$ multiplication is not performed using a multiplier because it is trivial, i.e., the multiplication by -j is implemented using sign changes and real and imaginary component swapping. The $W_8^1$ and $W_8^3$ twiddle factor multiplications are performed using the same fixed coefficient multiplier circuit.

Figure 6:
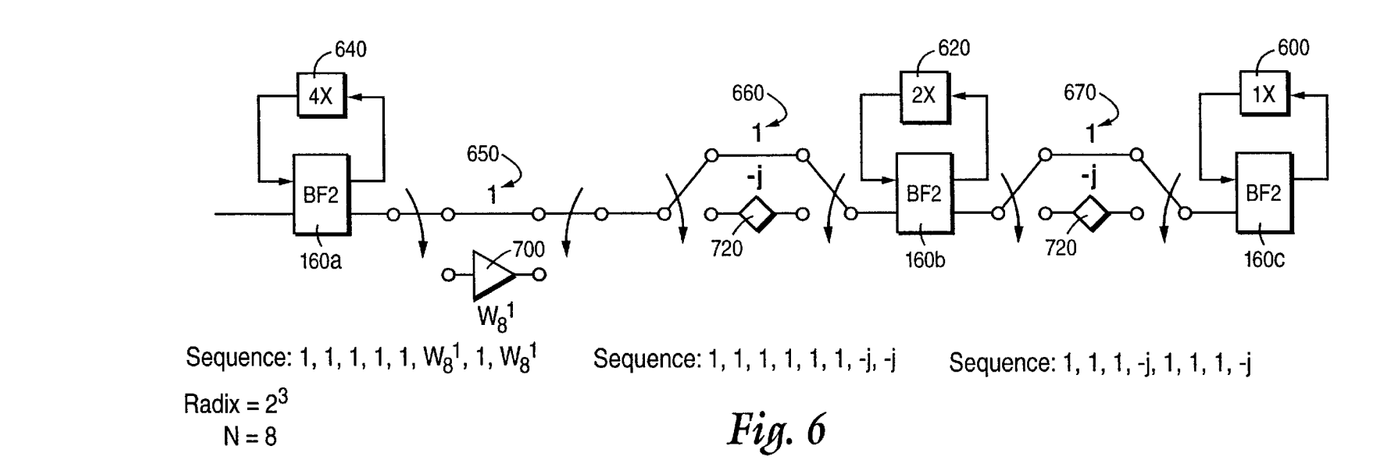
FIG. 6 is a diagram of the radix-$2^3$ butterfly shown in FIG. 4 implemented using fixed coefficient multipliers.

FIG. 6 shows the radix-$2^3$ butterfly module 160 of FIG. 4 implemented using trivial multiplications and a single fixed coefficient multiplier circuit. Depending upon the twiddle factor sequence shown for each twiddle factor processing stage 650 and 660, the appropriate element is switched into the signal processing path. Processing stage 650 includes a fixed coefficient multiplier as well as trivial twiddle factor multiplications. Multiplication "1" is implemented by simply connecting the signal processing path between the two nodes shown. When the output of butterfly unit 160a requires multiplication by the nontrivial twiddle factor $W_8^1$, the fixed coefficient multiplier 700 is switched into the signal processing path. This switching operation may be controlled by the timing signal generated by synchronization controllers 820 by decoding the controller numbers and controlling the switches accordingly. Processing stages 660 and 670 include switchable signal processing paths for trivial multiplications by "1" and by -j indicated at block 720.

Figure 7:
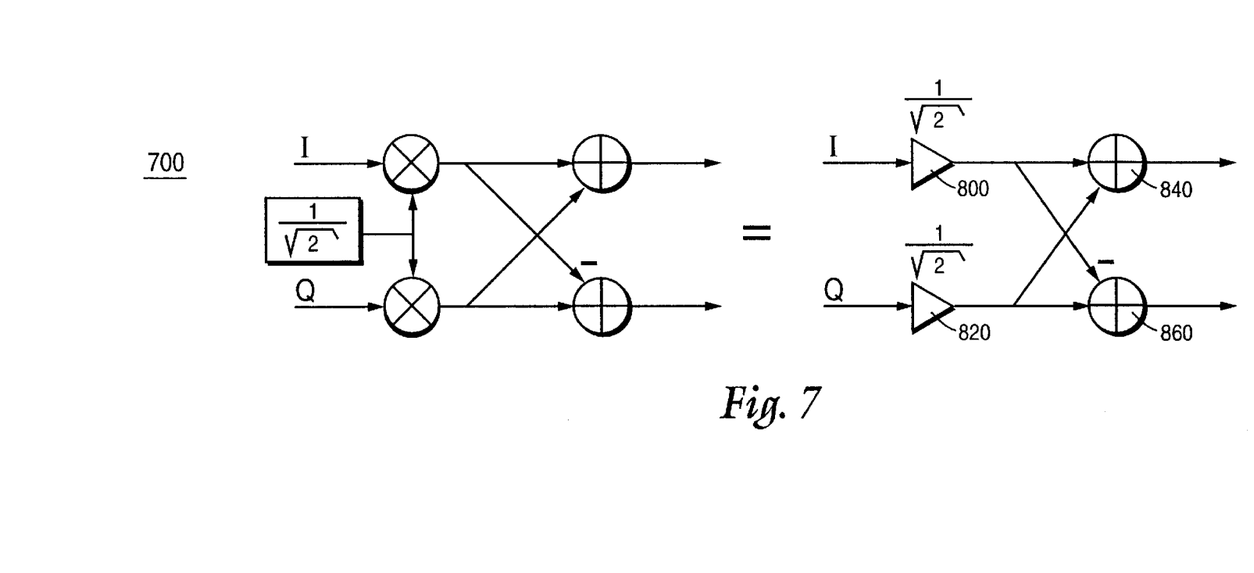
FIG. 7 shows one example fixed coefficient multiplier for implementing a $W_8^1$ twiddle factor multiplication.

One efficient implementation of a fixed coefficient multiplier for twiddle factor $W_8^1$ is shown in FIG. 7. Recall that $$W_8^1 = \frac{1}{\sqrt{2}}(1-j)$$

and $$W_8^3 = \frac{1}{\sqrt{2}}(-1-j).$$

Although the signal processing path in FIG. 6 is shown as a signal line, those skilled in the art will recognize that the data sequence is complex including both real (I) and imaginary (Q) components. Accordingly, FIG. 7 shows both I and Q signal processing paths. Advantageously, the two multiplications of the I and Q signals by $1/\sqrt{2}$ are implemented using two fixed coefficient multipliers 800 and 820 which consume considerably less power than two dynamic multipliers. The real and imaginary components are summed in summer 840 and output while the real component is subtracted from the imaginary component in subtractor 860 for $W_8^1$. The same multiplier circuitry is used for twiddle factor $W_8^1$ multiplication with the sign change being made for the real component.

An Example Radix-$2^4$ FFT Processor

Figure 8:
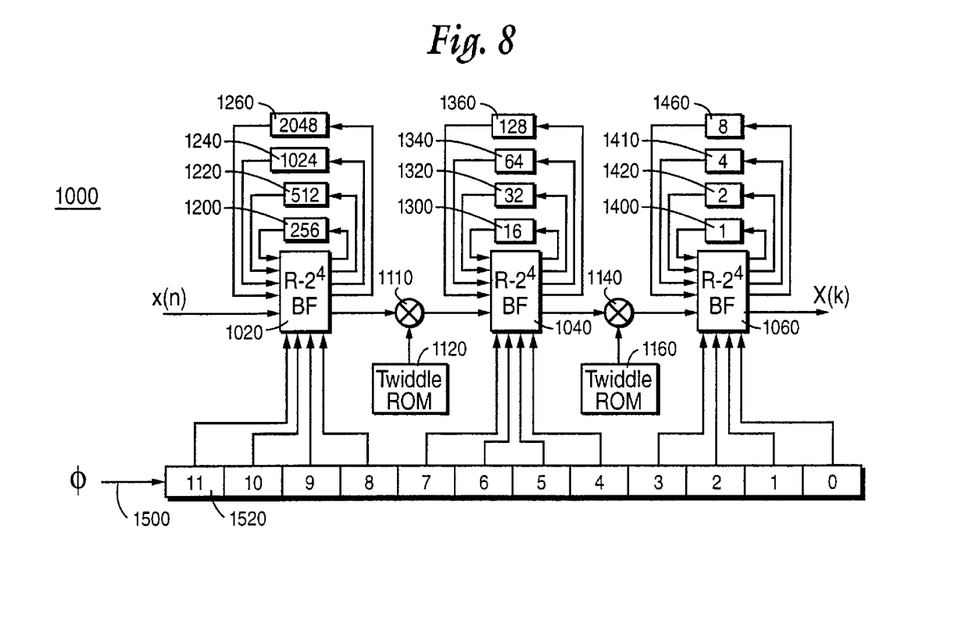
FIG. 8 is a diagram of a radix-$2^4$ single path delay feedback pipeline FFT processor in accordance with another preferred, example embodiment of the present invention.

A second example and preferred implementation of the present invention is shown in FIG. 8. The real time, pipelined FFT processor 1000 in FIG. 8 is a radix-$2^4$ single path delay feedback (SDF) architecture similar to the radix-$2^3$ SDF architecture shown in FIG. 3 except that the FFT operations are based on a radix-16 FFT algorithm rather than a radix-8 algorithm. An input sequence x(n) of N=4,096 points is input to a first radix-$2^4$ butterfly module 1020. The output from each R-$2^4$ (16) BF module is the 16-point FFT of the input to the module, where the frequency components are output in bit-reversed order. That output is coupled to multiplier 1000 for multiplication with a first twiddle factor multiplier $W_{4096}^{n*k}$, where n goes from 0 to 15 in bit-reversed order for each value of n, k that goes from 0 to (4096/16−1)=255. Therefore, 4096 twiddle factor values, of which about 1/16 (256) are trivial, are stored in the twiddle ROM 1120.

The twiddled products are processed in a second radix-$2^4$ butterfly module 1040 and multiplied in multiplier 1140 by the second twiddle factor multiplier $W_{256}n*k$, where n goes from 0 to 15 in bit-reversed order, which repeats 16 times, and for each value of n, k that goes from 0 to (4096/$16^2$−1)=15. Those twiddle factors stored in the twiddle ROM 1160. The twiddled products are processed in a final radix-$2^4$ butterfly module 1060 to generate the transformed sequence X(k).

The radix-16 butterfly module 1020 includes four 2-point FFT butterflies each having a single feedback path and corresponding feedback register 1200, 1220, 1240, and 1260. Butterfly module 1040 includes four feedback registers 1300, 1320, 1340, and 1360. Butterfly module 1060 includes four feedback registers 1400, 1420, 1440, and 1460. The FFT processor is operated in accordance with a clock signal 1500 received by a synchronization and address generator 1520 which controls the operation of each butterfly module and each butterfly unit within that module.

Figure 9A:
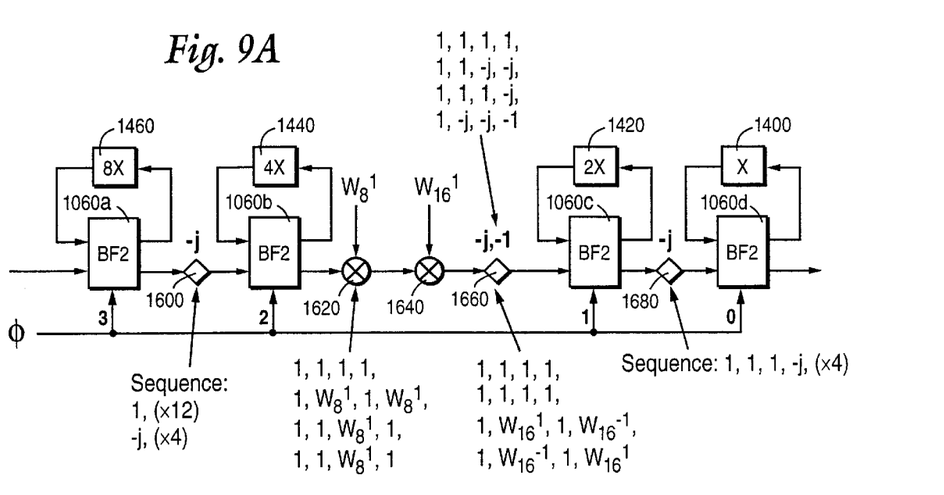
FIG. 9A is a diagram of a radix-$2^4$ butterfly module corresponding to a sixteen-point FFT used in each processing stage of the radix-24 pipeline FFT processor in FIG. 8.

FIG. 9A illustrates one of the radix-$2^4$ (16) butterfly units shown in FIG. 8 Four 2-point FFT butterflies 1060a, 1060b, 1060c, and 1060d are coupled together in pipeline fashion as shown. Butterfly unit 1060a includes a single path feedback register 1460 storing 8X words where X=1 for the butterfly module 1060, sixteen for butterfly module 1040, and 256 for butterfly module 1020. Butterfly unit 1060b includes a 4X word feedback register 1440. Butterfly unit 1060c includes a 2X word feedback register 1420, and butterfly unit 1060d includes an X-word feedback register 1400. The four 2-point butterfly units may be identical except for their respective different lengths of feedback first-in-first-out (FIFO) memory.

A radix-16 butterfly requires the following twiddle factor multiplications: $W_{16}^1$, $W_{16}^2$, $W_{16}^3$, $W_{16}^2$, $W_{16}^4$, $W_{16}^6$, $W_{16}^3$, $W_{16}^6$, and $W_{16}^9$. FIG. 5 shows these twiddle factors as vectors in the complex plane. By decomposing these radix-16 twiddle factors as follows, the twiddle factor multiplications may be simplified:

$$W_{16}^3 = W_{16}^{-1} \cdot W_{16}^4, \text{ where } W_{16}^4 = -j$$

$$W_{16}^9 = W_{16}^1 \cdot W_{16}^8, \text{ where } W_{16}^8 = -1.$$

$$W_{16}^2 = W_8^1, W_{16}^6 = W_8^3 = W_8^1 \cdot W_{16}^2.$$

Thus, some of the twiddle factors in the radix-16 butterfly, themselves or their decomposed twiddle factor components, are merely trivial multiplications and are not implemented using multipliers. In addition and as shown in FIG. 5, $W_{16}^1$ and $W_{16}^{-1}$ are symmetrical about the real axis so that $W_{16}^{-1}$ may be generated from $W_{16}^1$ by changing the sign of the imaginary component. Therefore, the $W_{16}^1$ and the $W_{16}^{-1}$ twiddle factor multiplications may be implemented using the same fixed coefficient multiplier. The only other fixed coefficient multiplier needed is that for implementing nontrivial, twiddle factor multiplications for $W_{16}^2$ and $W_{16}^6$. As demonstrated above, these two twiddle factor multiplications may be performed using a single $W_8^1$ multiplier such as the multiplier shown in FIG. 7. As a result, all of the twiddle factor multiplications for a radix-16 butterfly module may be performed using just two fixed coefficient multiplier circuits with the remaining multiplications/operations being trivial, e.g., sign changes, multiplying by unity, and real and imaginary component swapping.

Figure 9B:
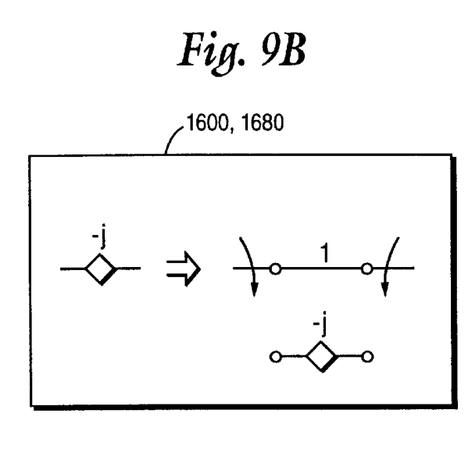
FIG. 9B is a diagram showing a trivial twiddle factor multiplication shown in FIG. 9A implemented without a multiplier.
Figure 9C:
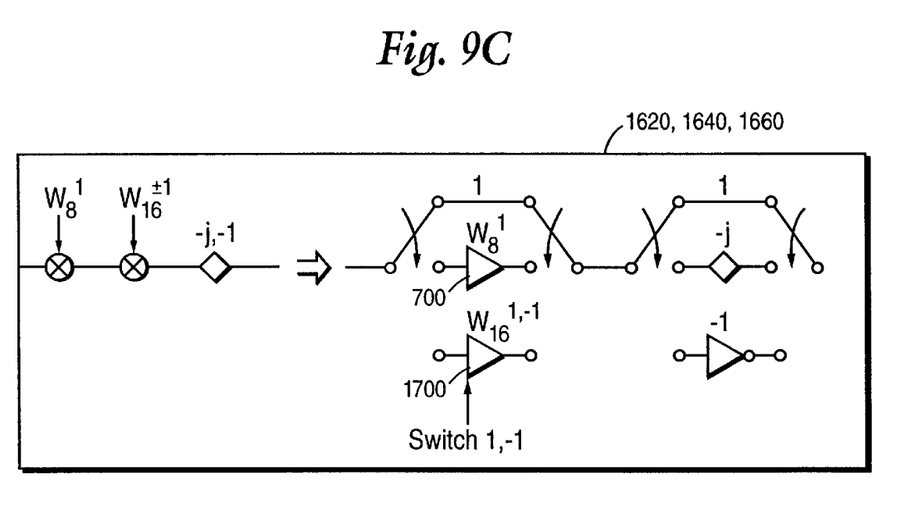
FIG. 9C is a diagram showing a fixed coefficient multiplier implementation of various nontrivial radix-16 twiddle factor multiplications for the radix-$2^4$ butterfly shown in FIG. 9A.

Returning to FIG. 9A–9C, the butterfly units 1060a and 1060b, as well as 1060c and 1060d, are linked by trivial twiddle factor multiplications of 1 and −j. FIG. 9B shows those trivial twiddle factor multiplications at reference numerals 1600 and 1680. Butterfly units 1060b and 1060c are coupled by two non-trivial twiddle factor multipliers 1620 and 1640 and one trivial complex twiddle factor multiplier 1660. FIG. 9C indicates how these nontrivial twiddle factor multiplications are implemented using fixed coefficient multipliers. Rather than implementing each type of radix-16 twiddle factor multiplication using a corresponding fixed coefficient multiplier, twiddle factor symmetry and decomposition are used to reduce the number of fixed coefficient multiplier circuits to only two.

Figure 10:
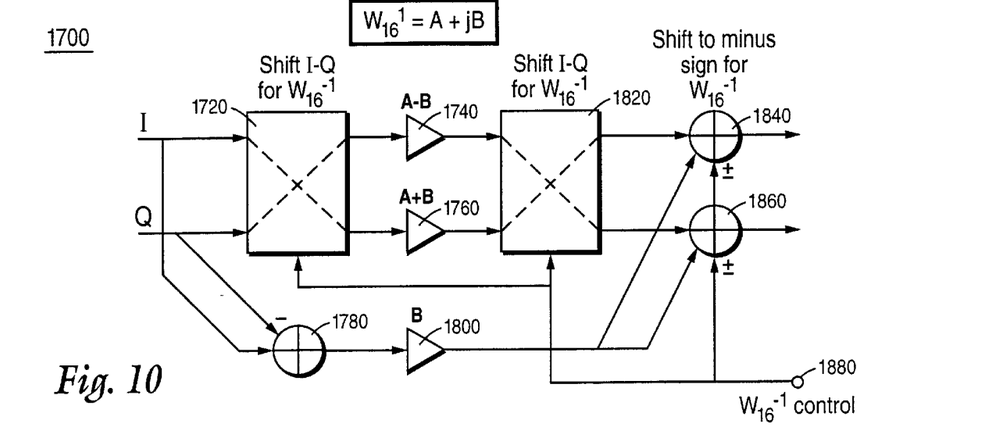
FIG. 10 shows one example fixed coefficient multiplier that implements multiplications for various radix-16 twiddle factors.

FIG. 10 illustrates such an efficient implementation where fixed coefficient multipliers are switchably controlled to implement the nontrivial, twiddle factor multiplications. I and Q channels are fed to an IQ shifter 1720 controlled by a control signal 1880 generated by the synchronization controller. The IQ shifter 1720 and IQ shifter 1820 (also controlled by signal 1880) either pass the I and Q data straight through if the twiddle factor multiplication is $W_{16}^1$ or switch the I and Q paths as shown if the twiddle factor multiplication is $W_{16}^{-1}$. The I and Q paths output from IQ shifter 1720 are processed in corresponding fixed coefficient multipliers 1740 and 1760 to implement multiplication by two different fixed numbers, A−B and A+B (A is the real component and B is the imaginary component). The outputs from elements 1740 and 1760 are processed in IQ shifter 1820 in accordance with control signal 1880 with the I and Q outputs being provided to summers 1840 and 1860. The originally input I and Q signals are also subtracted in subtractor 1780 and multiplied in fixed coefficient multiplier 180 by the imaginary component B. The output from element 1800 is either added or subtracted from the input I and Q signals depending upon the state of control signal 1880. Accordingly, the same three multipliers 1740, 1760, and 1800 shown in FIG. 10 may be used to perform the multiplications for several values of nontrivial, twiddle factors $W_{16}^X$.

Figure 11:
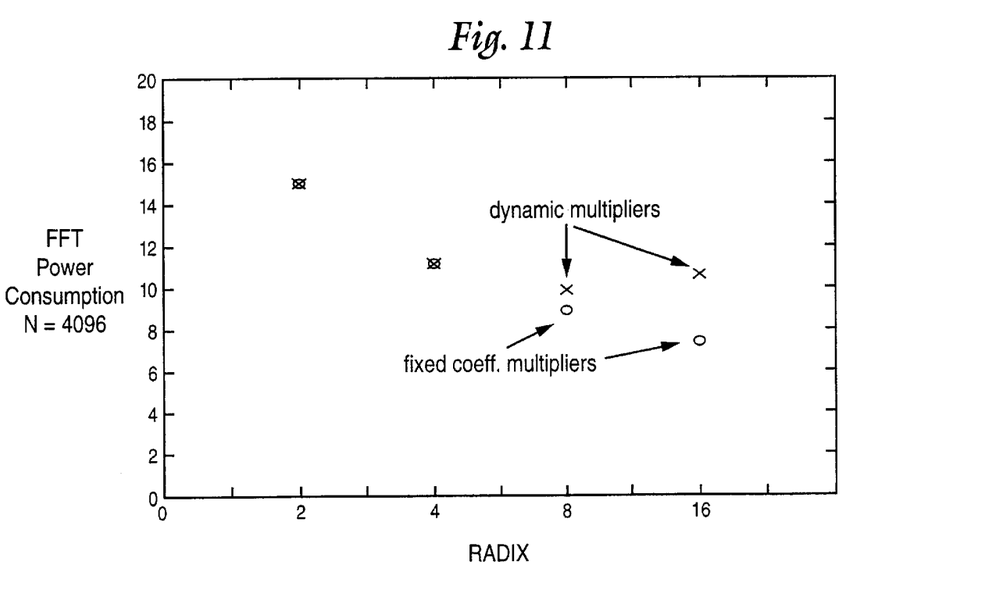
FIG. 11 is a graph showing FFT power consumption for a 4,096-point FFT implemented using different radix FFT processors.
Figure 12:
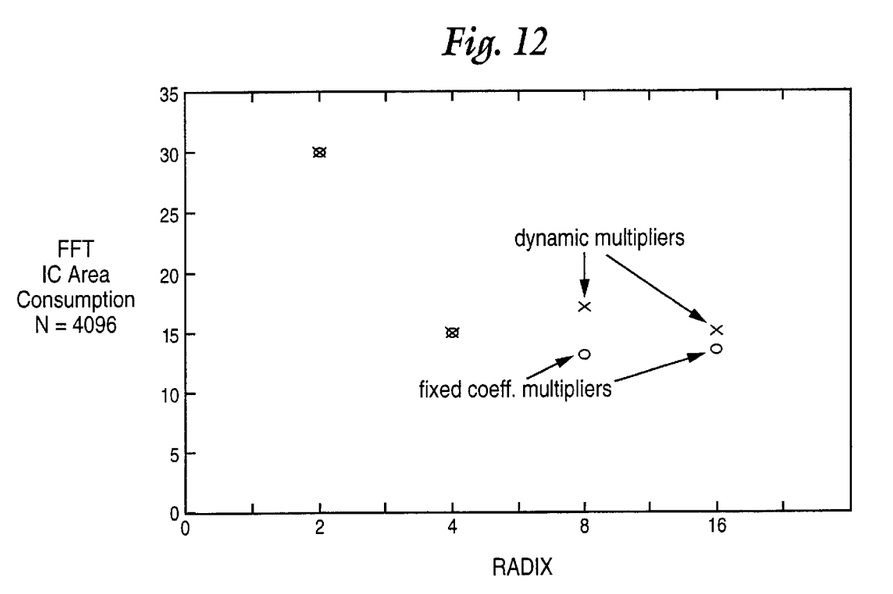
FIG. 12 is a graph showing FFT integrated circuit (IC) area consumption for a 4,096 FFT implemented using different radix FFT processors.

The advantages of the present invention are illustrated in the graphs shown in FIGS. 11 and 12. FIG. 11 graphs FFT processor power consumption for a 4,096 point data sequence against FFT radix size including radices 2, 4, 8, and 16. Using radixes greater than 4, taking advantage of twiddle factor symmetry and/or twiddle factor decomposition, and using fixed coefficient multipliers, the present invention achieves very low power consumption while keeping IC area consumption low as well.

More specifically, by increasing the radix of the FFT processor beyond radix-4, power consumption is decreased by 12% for radix-8 and 5% for radix-16, if dynamic multipliers are used throughout. If only dynamic multipliers are used, a minimum power consumption is achieved for a radix-8 FFT processor in accordance with the first example embodiment of the present invention. If only dynamic multipliers are used for a radix-16 FFT processor, power consumption actually increases rather than decreases, from radix-8. However, if fixed coefficient multipliers are used in the FFT processor rather than dynamic multipliers, significant savings in IC area and power consumption are achieved. In accordance with the present invention, a radix-16 FFT processor has the optimal lowest power consumption of all four illustrated radices and very low area consumption, (only the radix-8 FFT processor has a slightly lower area consumption), if fixed coefficient multipliers are used in the butterfly.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, the fixed coefficient multipliers, twiddle factor symmetry, and/or twiddle factor decomposition may be employed to FFT processors with butterfly units having sizes other than 8 or 16. While the example embodiment uses a pipelined processing architecture, the invention may be applied to other FFT processor architectures, e.g., an iterative architecture, and therefore is not limited to a particular FFT processor architecture.

What is claimed is:

1. A fast Fourier transform (FFT processor formed using minimal integrated circuit chip area for efficiently performing low power fast Fourier transform operations, comprising:

one or more butterfly modules having a radix greater than four, at least one butterfly module including a fixed coefficient multiplier circuit for performing a twiddle factor multiplication, wherein an input data stream is processed by the one or more butterfly modules to generate a transformed output data sequence.

2. The FFT processor in claim 1, wherein the radix of each butterfly module is eight.

3. The FFT processor in claim 2, wherein all of the nontrivial twiddle factor multiplications in each 8-point butterfly module are implemented using only one fixed coefficient multiplier circuit.

4. The FFT processor in claim 3, wherein the one fixed coefficient multiplier circuit includes: real and imaginary component multipliers with the output of the real component multiplier added in a first adder to the output of the imaginary component multiplier and the real multiplier output subtracted in a second adder from the imaginary multiplier output.

5. The FFT processor in claim 1, wherein the radix of each butterfly module is sixteen.

6. The FFT processor in claim 3, wherein the 16-point butterfly module employs two fixed coefficient multiplier circuits to perform all nontrivial twiddle factor multiplications.

7. The EFT processor in claim 6, wherein the two fixed coefficient multiplier circuits in each 16-point DFT module including:

a first fixed coefficient multiplier circuit having real and imaginary component multipliers, with the output of the real component multiplier added in a first adder to the output of the imaginary component multiplier and the real multiplier output subtracted in a second adder from the imaginary multiplier output, and a second fixed coefficient multiplier circuit having real and imaginary shifters shifted to a first state for one twiddle factor multiplication and to a second state for another twiddle factor multiplication.

8. The FFT processor in claim 1, wherein twiddle factor multiplications include nontrivial multiplications and trivial multiplications, and wherein nontrivial multiplications are performed using fixed coefficient multipliers.

9. The FFT processor in claim 4, wherein the trivial multiplications are performed without multipliers, by performing no operation, making a sign change, or shifting real and imaginary components.

10. The FFT processor in claim 4, wherein different nontrivial twiddle factor value multiplications are performed using the same fixed coefficient multiplier circuitry.

11. The FFT processor in claim 8, wherein at least one nontrivial twiddle factor is decomposed into two component twiddle factors to reduce the number of different nontrivial twiddle factor values.

12. The FFT processor in claim 8, wherein a symmetrical relationship between at least two nontrivial twiddle factors is used to reduce the number of different nontrivial twiddle factor values.

13. A method for computing a fast Fourier transform (FFT) with an FFT processor formed using minimal integrated circuit chip area to efficiently perform fast Fourier transform operations with reduced power, comprising the steps of:

constructing the FFT processor with plural processing modules having a radix greater than four, each processing module including a fixed coefficient multiplier for performing a twiddle factor multiplication, and processing an input data stream in each processing module to generate a transformed output data sequence.

14. The method in claim 13, wherein the radix of each processing module is eight.

15. The method in claim 14, further comprising:

implementing all of the nontrivial twiddle factor multiplications in each 8-point processing module using only one fixed coefficient multiplier circuit to perform all nontrivial twiddle factor multiplications in each 8-point processing module.

16. The method in claim 13, wherein the radix of each processing module is sixteen.

17. The method in claim 16, further comprising:

implementing all of the nontrivial twiddle factor multiplications in each 16-point processing module using only two fixed coefficient multiplier circuits to perform all nontrivial twiddle factor multiplications in each 16-point processing module.

18. The method in claim 13, further comprising:

separating twiddle factor multiplications in each processing module into nontrivial multiplications and trivial multiplications, and performing the nontrivial multiplications using one or more fixed coefficient multipliers.

19. The method in claim 18, wherein the trivial multiplications are performed without multipliers, either by performing no operation, mating a sign change, or shifting real and imaginary components.

20. The method in claim 18, further comprising:

performing different nontrivial twiddle factor value multiplications in each processing module using fixed coefficient multiplier circuitry corresponding to each different nontrivial twiddle factor value multiplication.

21. The method in claim 18, further comprising:

performing different nontrivial twiddle factor value multiplications in each processing module using the same fixed coefficient multiplier circuitry.

22. The method in claim 18, further comprising:
decomposing at least one nontrivial twiddle factor into two component twiddle factors to reduce the number of different nontrivial twiddle factor values.

23. The method in claim 18, further comprising:
using a symmetrical relationship between at least two nontrivial twiddle factors to reduce the number of different nontrivial twiddle factor values.

24. A fast Fourier transform (FFT) processor formed using minimal integrated circuit chip area for efficiently performing low power fast Fourier transform operations, comprising:
one or more discrete Fourier transfer (DFT) modules, each DFT module having three, 2-point butterfly units coupled together, and
one or more twiddle factor multipliers implemented using a fixed coefficient multiplier circuit linking two of the 2-point butterfly units,
wherein an input data stream is processed by the three butterfly units to generate a transformed output data sequence.

25. The FFT processor in claim 24, wherein the FFT processor is pipelined with a pipeline register located between each butterfly unit, and each 2-point butterfly unit includes a feedback path between an output therefrom to and an input thereto.

26. The FFT processor in claim 25, wherein the feedback path is a single delay feedback path, and wherein each DFT module includes three feedback registers each accommodating different size feedback sequences.

27. The FFT processor in claim 26, wherein DFT modules are connected to a twiddle factor memory through a dynamic multiplier such that the output from one of the butterfly modules is multiplied by twiddle factors retrieved from the twiddle factor memory in the dynamic multiplier before being processed in the adjacent DFT module.

28. The FFT processor in claim 24, wherein trivial twiddle factor multiplications are performed without using multiplier circuitry.

29. The FFT processor in claim 28, wherein trivial twiddle factor multiplications are performed using no operation, sign change operation, or a real and imaginary component swapping operations.

30. The FFT processor in claim 24, wherein the fixed coefficient multiplier circuit includes real and imaginary component multipliers with the output of the real multiplier added in a first adder to the output of the imaginary multiplier and with the real output subtracted in a second adder from the imaginary output.

31. The FFT processor in claim 24, wherein the same fixed coefficient multiplier circuit is used to perform all nontrivial twiddle factor multiplications to be performed in each DFT module.

32. A fast Fourier transform (FFT) processor formed using minimal integrated circuit chip area for efficiently performing low power fast Fourier transform operations, comprising:
one or more discrete Fourier transform (DFT) modules, each DFT module having four, 2-point butterfly units coupled together, and
one or more twiddle factor multipliers implemented using a fixed coefficient multiplier circuit linking at least two of the 2-point butterfly units,
wherein an input data stream is processed by the three butterfly units to generate a transformed output data sequence.

33. The FFT processor in claim 32, wherein the FFT processor is pipelined with a pipeline register located between each butterfly unit, and each 2-point butterfly unit includes a feedback path between an output therefrom to and an input thereto.

34. The FFT processor in claim 33, wherein the feedback is a single delay feedback path, and wherein each DFT module includes four feedback registers each accommodating different size feedback sequences.

35. The FFT processor in claim 32, wherein trivial twiddle factor multiplications are performed without using multiplier circuitry.

36. The FFT processor in claim 35, wherein trivial twiddle factor multiplications are performed using no operation, a sign change operation, or a real and imaginary component swapping operations.

37. The FFT processor in claim 32, wherein a first fixed coefficient multiplier circuit includes first real and imaginary component multipliers with the output of the first real multiplier added in a first adder to the output of the first imaginary multiplier and with the real multiplier output subtracted in a second adder from the imaginary multiplier output.

38. The FFT processor in claim 37, wherein a second fixed coefficient multiplier circuit includes real and imaginary component shifters, the shifters being shifted to a first state for one twiddle factor multiplication and to a second state for another twiddle factor multiplication.

39. The FFT processor in claim 38, wherein the first and second fixed multiplier circuits are used to perform all nontrivial twiddle factor multiplications to be performed in each DFT module.

40. A method for computing a fast Fourier transform (FFT) with an FFT processor formed using minimal integrated circuit chip area to efficiently perform fast Fourier transform operations with reduced power, comprising the steps of:
constructing the FFT processor with one or more processing modules, each processing module implementing three, 2-point butterfly units coupled together in pipeline fashion and at least two of the butterfly units linked by a fixed coefficient multiplier circuit;
applying an input data stream to an input of a first one of the three butterfly units and processing the input data stream;
processing an output of the first butterfly unit in a second one of the three butterfly units; and
processing an output of the second butterfly unit in a third one of the three butterfly units to generate an output data sequence.

41. The method in claim 40, further comprising:
performing different nontrivial twiddle multiplications using the same fixed coefficient multiplier circuit.

42. The method in claim 41, wherein all nontrivial twiddle factor multiplications for each processing module are performed using the fixed coefficient multiplier circuit.

43. A method for computing a fast Fourier transform (FFT) with an FFT processor formed using minimal integrated circuit chip area to efficiently perform fast Fourier transform operations with reduced power, comprising the steps of:
constructing the FFT processor with one or more processing modules, each processing module having four, 2-point butterfly units coupled together in pipeline fashion with at least two of the 2-point butterfly units linked by a fixed coefficient multiplier circuit;
applying an input data stream to an input of a first one of the four butterfly units and processing the input data stream;
processing an output of the first butterfly unit in a second one of the four butterfly units;
processing an output of the second butterfly unit in a third one of the four butterfly units; and processing an output of the second butterfly unit in a fourth one of the four butterfly units to generate an output data sequence.

44. The method in claim 43, further comprising:

performing different, nontrivial multiplications using the same fixed coefficient multiplier circuit.

45. The method in claim 43, wherein all nontrivial twiddle factor multiplications for each processing module are performed using two fixed coefficient multiplier circuits.

\* \* \* \* \*